US011363203B2

(12) United States Patent
Kimura et al.

(10) Patent No.: US 11,363,203 B2
(45) Date of Patent: Jun. 14, 2022

(54) IMAGE STABILIZATION APPARATUS, IMAGE STABILIZATION CONTROL METHOD, AND COMPUTER-READABLE STORAGE MEDIUM

(71) Applicant: CANON KABUSHIKI KAISHA, Tokyo (JP)

(72) Inventors: Masafumi Kimura, Kawasaki (JP); Toshifumi Urakami, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/867,595

(22) Filed: May 6, 2020

(65) Prior Publication Data

US 2020/0358942 A1 Nov. 12, 2020

(30) Foreign Application Priority Data

May 8, 2019 (JP) .............................. JP2019-088574

(51) Int. Cl.
*H04N 5/232* (2006.01)
*G03B 13/02* (2021.01)
*G03B 13/36* (2021.01)

(52) U.S. Cl.
CPC ......... *H04N 5/23287* (2013.01); *G03B 13/02* (2013.01); *G03B 13/36* (2013.01); *H04N 5/2327* (2013.01); *H04N 5/23254* (2013.01)

(58) Field of Classification Search
CPC .................... H04N 5/2328; H04N 5/23287
See application file for complete search history.

(56) References Cited

U.S. PATENT DOCUMENTS 5,966,549 A * 10/1999 Hara ...................... G03B 15/05
396/176

FOREIGN PATENT DOCUMENTS

| CN | 102055892 A | 5/2011 |
| CN | 102065216 A | 5/2011 |
| CN | 102998874 A | 3/2013 |
| CN | 105378555 A | 3/2016 |
| CN | 107852448 A | 3/2018 |
| CN | 109428999 A | 3/2019 |

(Continued)

OTHER PUBLICATIONS

Dec. 17, 2021 Chinese Office Action, which is enclosed with an English Translation, that issued in Chinese Patent Application No. 202010390438.0.

*Primary Examiner* — Daniel M Pasiewicz
(74) *Attorney, Agent, or Firm* — Cowan, Liebowitz & Latman, P.C.

(57) ABSTRACT

An image stabilization apparatus comprises: a first obtaining unit that obtains orientation information of an image capturing apparatus; a determining unit that, on the basis of the orientation information, determines a reference position of an image sensor included in the image capturing apparatus; and a calculating unit that calculates a correction amount for performing image stabilization by moving a position of the image sensor from the reference position in a plane intersecting with an optical axis. The reference position is different between when the orientation information indicates that the image capturing apparatus is in a first orientation and when the orientation information indicates that the image capturing apparatus is in a second orientation.

16 Claims, 11 Drawing Sheets

(56) References Cited

FOREIGN PATENT DOCUMENTS

| JP | 09-027926 A | 1/1997 |
| JP | 2001-257930 A | 9/2001 |

\* cited by examiner

FIG. 10A

UPRIGHT POSITION

|  | 24mm | 50mm | 105mm |
|---|---|---|---|
| F4.0 | PN11 | PN12 | PN13 |
| F5.6 | PN21 | PN22 | PN23 |
| F8.0 | PN31 | PN32 | PN33 |
| F11 | PN41 | PN42 | PN43 |

FIG. 10B

VERTICAL POSITION (RIGHT 90° ROTATION)

|  | 24mm | 50mm | 105mm |
|---|---|---|---|
| F4.0 | PR11 | PR12 | PR13 |
| F5.6 | PR21 | PR22 | PR23 |
| F8.0 | PR31 | PR32 | PR33 |
| F11 | PR41 | PR42 | PR43 |

FIG. 10C

VERTICAL POSITION (LEFT 90° ROTATION)

|  | 24mm | 50mm | 105mm |
|---|---|---|---|
| F4.0 | PL11 | PL12 | PL13 |
| F5.6 | PL21 | PL22 | PL23 |
| F8.0 | PL31 | PL32 | PL33 |
| F11 | PL41 | PL42 | PL43 |

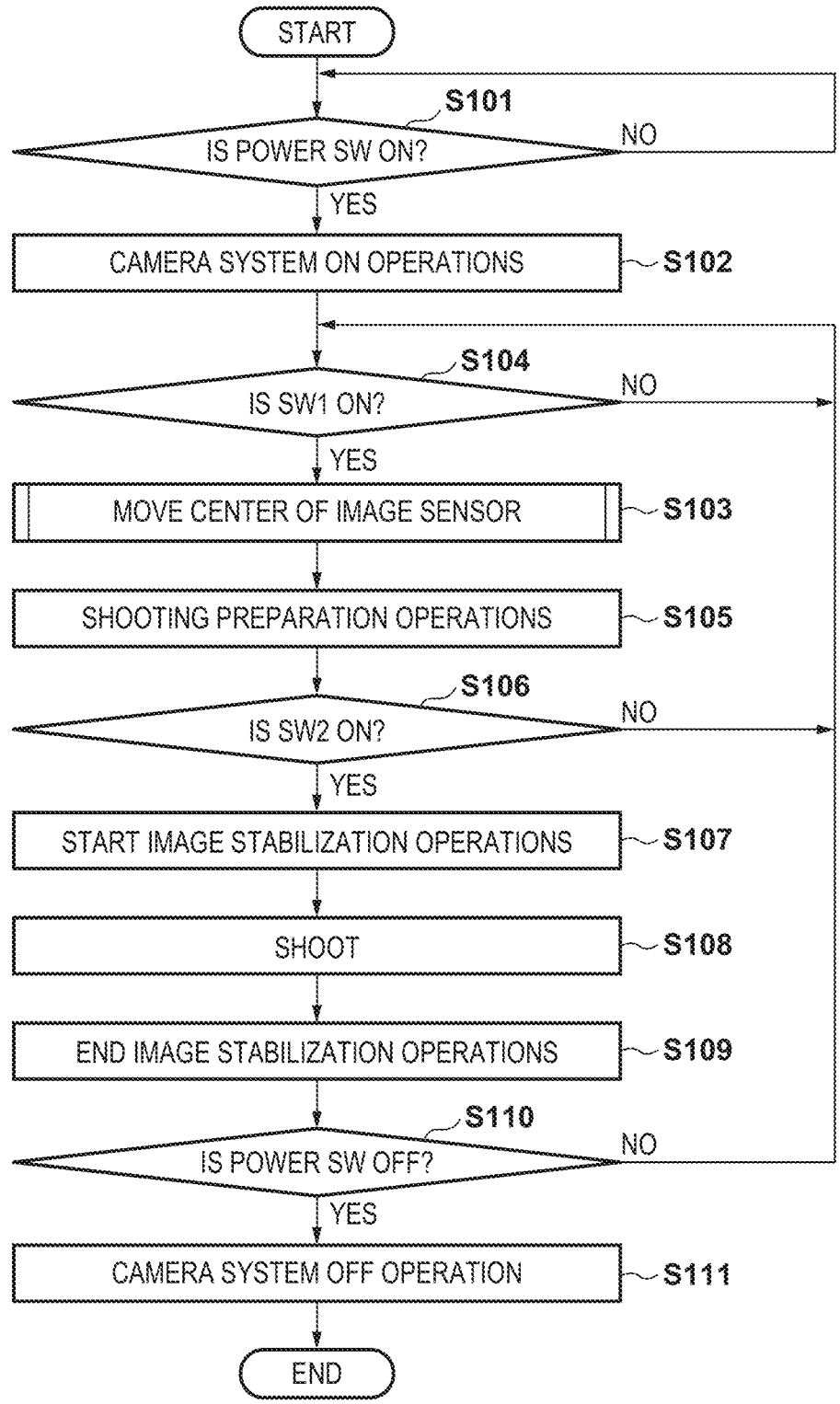

IMAGE STABILIZATION APPARATUS, IMAGE STABILIZATION CONTROL METHOD, AND COMPUTER-READABLE STORAGE MEDIUM

BACKGROUND OF THE INVENTION

Field of the Invention

The present invention relates to an image stabilization apparatus, an image stabilization control method, and a computer-readable storage medium.

Description of the Related Art

Some image capturing apparatuses have image stabilization mechanisms for suppressing image blur caused by the photographer's hand shaking or the like. An image stabilization mechanism corrects image blur by moving an image sensor in orthogonal and rotational directions relative to an optical axis. When there is a high amplitude of vibration, the image sensor is moved extensively to suppress the resulting image blur. However, when there is no leeway in terms of the size of the image circle of the lens attached to the image capturing apparatus, or when manufacturing error or the like has resulted in the center of the image circle being shifted, moving the image sensor extensively makes it impossible to obtain a sufficient amount of light at the corner parts of the image sensor. This results in vignetting, where the corner parts of the shot image are dark. If the image sensor is therefore moved within a range where such vignetting has little effect, the amount of movement of the image sensor will not be sufficient to fully correct the image blur.

Accordingly, Japanese Patent Laid-Open No. 9-027926 proposes communicating position information of the center of the image circle of a lens (i.e., the optical axis of the lens) to the camera and then shifting the image sensor so that the center of the image sensor coincides with the optical axis of the lens. Doing so makes it possible to eliminate shifting of the lens optical axis caused by manufacturing error or the like, which in turn ensures, to a certain degree, the required amount of movement in the image sensor for correcting image blur.

However, the center position, size, and so on of the image circle differ depending on the orientation of the image capturing apparatus, as well as the state of the lens, including the focal length, the focal state, the aperture, and so on. Thus in an interchangeable lens-type image capturing system, the lens which is attached and used may not necessarily have optical axis position information that corresponds to the orientation of the image capturing apparatus, the state of the lens, and so on. Accordingly, in situations where information of the image circle cannot be obtained, it has been unclear how to appropriately determine a target position for the center of the image sensor at which there will be little loss of image quality when correcting image blur.

SUMMARY OF THE INVENTION

The present invention has been made in consideration of the above situation, and makes it possible to correct image blur while suppressing the effects of vignetting in response to a variety of situations in an image capturing system.

According to the present invention, provided is an image stabilization apparatus, comprising: a first obtaining unit that obtains orientation information of an image capturing apparatus; a determining unit that, on the basis of the orientation information, determines a reference position of an image sensor included in the image capturing apparatus; and a calculating unit that calculates a correction amount for performing image stabilization by moving a position of the image sensor from the reference position in a plane intersecting with an optical axis, wherein the reference position is different between when the orientation information indicates that the image capturing apparatus is in a first orientation and when the orientation information indicates that the image capturing apparatus is in a second orientation, and wherein each unit is implemented by at least one processor or circuitry, or combination thereof.

Further, according to the present invention, provided is an image stabilization apparatus, comprising: a first obtaining unit that obtains, from at least one of an image capturing apparatus and a lens unit attached to the image capturing apparatus, a state of the image capturing apparatus and/or the lens unit; a second obtaining unit that, when the state satisfies a predetermined condition, obtains lens information corresponding to the state from lens information of the lens unit corresponding to a plurality of predetermined states; a determining unit that determines a reference position of an image sensor included in the image capturing apparatus; and a calculating unit that calculates a correction amount for performing image stabilization by moving a position of the image sensor from the reference position in a plane intersecting with an optical axis, wherein when the state satisfying the predetermined condition is not obtained by the first obtaining unit, the determining unit determines the reference position through a first method based on information aside from the lens information, and wherein each unit is implemented by at least one processor or circuitry, or combination thereof.

Further, according to the present invention, provided is an image stabilization control method, comprising: obtaining orientation information of an image capturing apparatus; determining, on the basis of the orientation information, a reference position of an image sensor included in the image capturing apparatus; and calculating a correction amount for performing image stabilization by moving a position of the image sensor from the reference position in a plane intersecting with an optical axis, wherein the reference position is different between when the orientation information indicates that the image capturing apparatus is in a first orientation and when the orientation information indicates that the image capturing apparatus is in a second orientation.

Further, according to the present invention, provided is an image stabilization control method, comprising: obtaining, from at least one of an image capturing apparatus and a lens unit attached to the image capturing apparatus, a state of the image capturing apparatus and/or the lens unit; obtaining, when the state satisfies a predetermined condition, lens information corresponding to the state from lens information of the lens unit corresponding to a plurality of predetermined states; determining a reference position of an image sensor included in the image capturing apparatus; and calculating a correction amount for performing image stabilization by moving a position of the image sensor from the reference position in a plane intersecting with an optical axis, wherein when the state satisfying the predetermined condition is not obtained, in the determining, the reference position is determined through a first method based on information aside from the lens information.

Further, according to the present invention, provided is a computer-readable storage medium in which is stored a program for causing a computer to function as the respective units in the image stabilization apparatus comprising: a first obtaining unit that obtains orientation information of an image capturing apparatus; a determining unit that, on the basis of the orientation information, determines a reference position of an image sensor included in the image capturing apparatus; and a calculating unit that calculates a correction amount for performing image stabilization by moving a position of the image sensor from the reference position in a plane intersecting with an optical axis, wherein the reference position is different between when the orientation information indicates that the image capturing apparatus is in a first orientation and when the orientation information indicates that the image capturing apparatus is in a second orientation.

Further, according to the present invention, provided is a computer-readable storage medium in which is stored a program for causing a computer to function as the respective units in the image stabilization apparatus comprising: a first obtaining unit that obtains, from at least one of an image capturing apparatus and a lens unit attached to the image capturing apparatus, a state of the image capturing apparatus and/or the lens unit; a second obtaining unit that, when the state satisfies a predetermined condition, obtains lens information corresponding to the state from lens information of the lens unit corresponding to a plurality of predetermined states; a determining unit that determines a reference position of an image sensor included in the image capturing apparatus; and a calculating unit that calculates a correction amount for performing image stabilization by moving a position of the image sensor from the reference position in a plane intersecting with an optical axis, wherein when the state satisfying the predetermined condition is not obtained by the first obtaining unit, the determining unit determines the reference position through a first method based on information aside from the lens information.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 10A to 10C are diagrams illustrating examples of lens information according to embodiments.

FIG. 11 is a flowchart illustrating operations of an image capturing apparatus according to a second embodiment.

DESCRIPTION OF THE EMBODIMENTS

Figure 1:
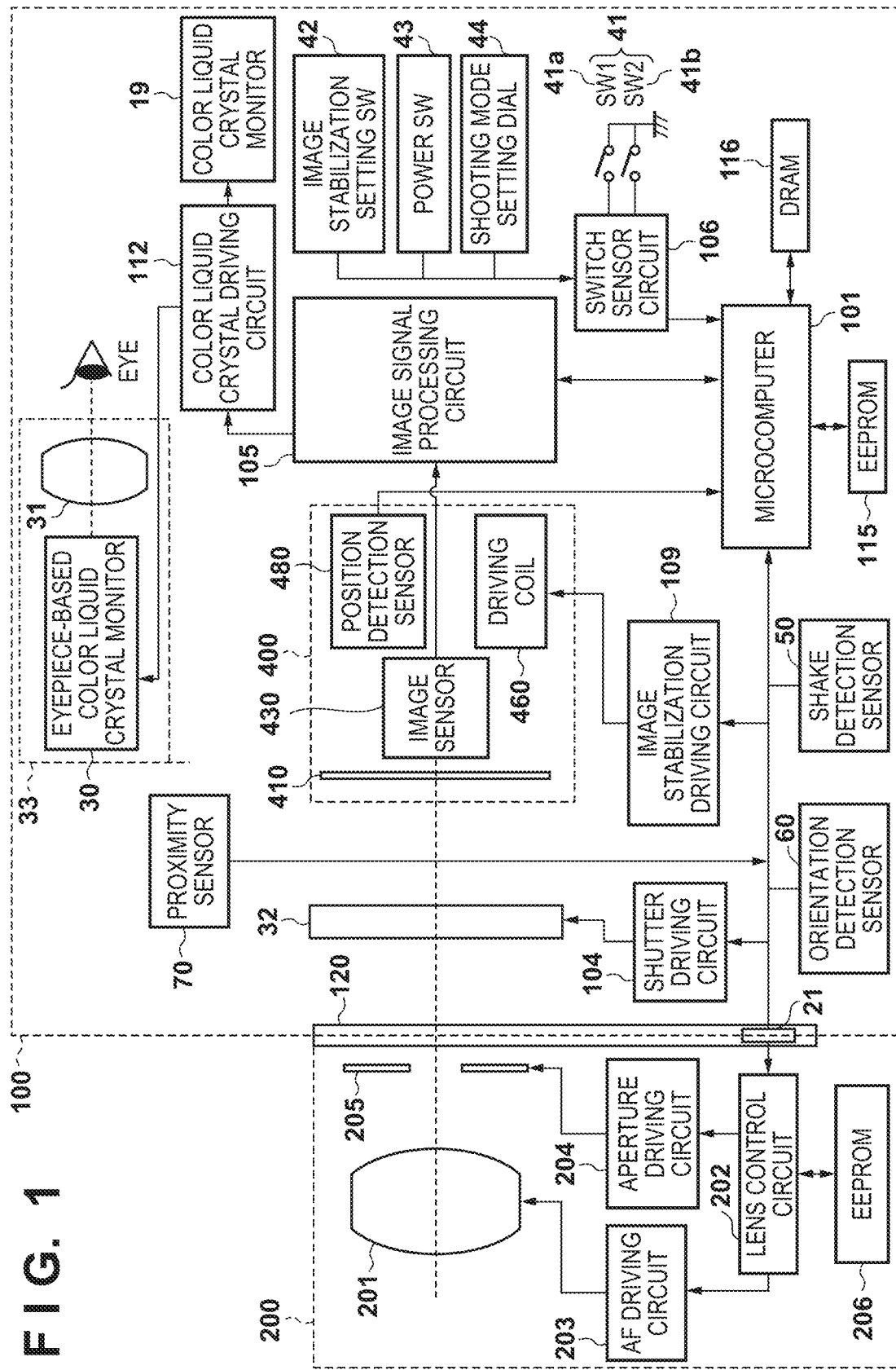
FIG. 1 is a block diagram illustrating a functional configuration of an image capturing system according to embodiments of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

FIG. 1 is a block diagram illustrating the functional configuration of an image capturing system according to embodiments of the present invention. The image capturing system includes a camera body 100, which is an image capturing apparatus, and a lens unit 200 which can be attached to and removed from the camera body 100.

First Embodiment

In the camera body 100, a microcomputer ("MPU" hereinafter) 101 is a control unit that comprehensively controls the operations of the various constituent elements of the image capturing system. The MPU 101 controls a shutter driving circuit 104, an image signal processing circuit 105, a switch sensor circuit 106, and an image stabilization driving circuit 109. The MPU 101 also holds data in Electrically Erasable Programmable Read-Only Memory (EEPROM) 115. Furthermore, the MPU 101 loads data which is temporarily needed in DRAM 116, and accesses that data when necessary.

The MPU 101 communicates with a lens control circuit 202 within the lens unit 200 via a mount contact point 21. When the lens unit 200 is mounted to a mount part 120 of the camera body 100, the MPU 101 determines whether or not it is possible to communicate with the lens control circuit 202 by receiving a signal through the mount contact point 21. Note that the mount part 120 is annular, and is configured so that the lens unit 200 can be mounted to and removed from the mount part 120.

The lens control circuit 202 controls the driving of a lens 201 and an aperture stop 205 in an imaging optical system via an autofocus (AF) driving circuit 203 and an aperture driving circuit 204, in response to control signals received from the MPU 101. Although FIG. 1 illustrates only a single lens 201 for the sake of simplicity, the lens 201 is actually constituted by multiple lenses, including a focus lens and the like. Furthermore, the lens control circuit 202 reads out necessary information by communicating with EEPROM 206 provided in the lens unit 200. The EEPROM 206 stores lens information such as image circle center position information, image circle diameter information, information of the highest-resolution position, resolution distribution information, and the like for each individual lens unit 200.

The MPU 101 carries out focus detection computations according to a phase difference detection method on the basis of an image signal obtained by an image sensor 430 photoelectrically converting an optical image of a subject. Specifically, the MPU 101 calculates a defocus amount and direction using the image signal, and sends a control signal to the lens control circuit 202. The lens control circuit 202 carries out control for moving the focus lens to an in-focus position via the AF driving circuit 203 in accordance with the calculated defocus amount and direction.

A shutter unit 32 is a mechanical focal plane shutter, and includes front curtain blades and rear curtain blades. When not shooting, as well as when shooting a moving image, the front curtain blades and the rear curtain blades are held in an exposure position, which allows light beams to pass from the subject to the image sensor 430.

However, when shooting a still image, light beams for shooting an image are allowed to pass by the front curtain blades performing exposure travel, in which the front curtain blades move from a light-blocking position to an exposure position. After a set exposure time (shutter speed) has passed, the rear curtain blades perform light-blocking travel, in which the rear curtain blades move from the exposure position to the light-blocking position. This completes the shooting for a single image's worth of data. The shutter unit 32 is controlled by the shutter driving circuit 104 in response to control commands from the MPU 101. Note that instead of front curtain blades, the exposure time may be controlled by what is known as an "electronic front curtain", which resets charges in the image sensor 430.

An image sensor unit 400 includes an optical low-pass filter 410, the image sensor 430, and an image stabilization mechanism unit. The image sensor 430 is an image sensing device using a CMOS, a CCD, or the like, for example, and outputs an analog image signal by photoelectrically converting an optical image of a subject which has been formed. Although details will be given later, the image stabilization mechanism unit includes a driving coil 460 and a position detection sensor 480. Image stabilization operations are carried out by the image stabilization driving circuit 109 controlling the electrification of the driving coil 460, and moving the image sensor 430, on the basis of the detection signal resulting from hand shake or the like.

The image signal processing circuit 105 carries out analog/digital (A/D) conversion processing on the analog image signal output from the image sensor 430, and further executes image processing, such as noise removal processing, gain adjustment processing, and the like, on the obtained digital image data.

A color liquid crystal driving circuit 112 causes an image to be displayed in the screen of a color liquid crystal monitor 19, in accordance with the image data output by the image signal processing circuit 105. This makes it possible for a user to monitor the image he or she is about to shoot, confirm an image he or she has shot, and so on. The color liquid crystal driving circuit 112 also causes images to be displayed in the screen of an eyepiece-based liquid crystal monitor 30. The camera body 100 includes a viewfinder 33 through which the subject can be observed, and the user can observe an image displayed in the eyepiece-based liquid crystal monitor 30, in an optically-enlarged manner, through an ocular lens 31 provided within the viewfinder 33.

The switch sensor circuit 106 detects a switch (SW) signal from an operation member and outputs that signal to the MPU 101. FIG. 1 illustrates a release switch (SW) 41 (41a, 41b), an image stabilization setting switch (SW) 42, a power switch (SW) 43, and a shooting mode setting dial 44 as examples of operation members. The release SW 41 is a starting switch used when the user instructs shooting to start, and has a switch structure which is operated in steps. For example, a first switch SW1 (41a) turns on with a first stroke, when the switch is pressed halfway or the like, and a second switch SW2 (41b) turns on with a second stroke, when the switch is fully depressed or the like. The image stabilization setting SW 42 is a switch for setting image stabilization processing on and off. The power SW 43 is a switch for turning the power to the camera body 100 on and off. The shooting mode setting dial 44 is a rotational operation member used to select and set shooting modes such as still image shooting, moving image shooting, and the like.

A shake detection sensor 50 detects shake in the camera body 100 caused by the user's hand shaking, movement in the user's body, and so on. An angular velocity sensor such as a gyrosensor or the like is used for the shake detection sensor 50. The shake detection sensor 50 detects, for example, an angular velocity in each of a horizontal direction (an X direction) orthogonal to an image capturing optical axis, a vertical direction (a Y direction) orthogonal to the image capturing optical axis, and a direction of rotation about the image capturing optical axis (a roll direction). A shake detection signal from the shake detection sensor 50 is output to the MPU 101.

The position detection sensor 480 in the image sensor unit 400 includes a Hall device or the like, and detects a position of the image sensor 430. The position detection sensor 480 detects displacement in the X direction, displacement in the Y direction, and rotational displacement in a direction about the optical axis (the roll direction), and outputs a position detection signal to the MPU 101.

An orientation detection sensor 60 detects an orientation of the camera body 100. As the orientations of the camera, the orientation detection sensor 60 detects an upright position, a vertical position rotated 90° to the right, a vertical position rotated 90° to the left, a state in which the lens is pointed downward, and a state in which the lens is pointed upward. The orientation detection sensor 60 furthermore detects a pitched state (an intermediate state between the upright position and a state in which the lens is pointed downward or upward), a state of rotation (an intermediate state between the upright position and the vertical position), and so on. An accelerometer is used for the orientation detection sensor 60, and an orientation detection signal expressing the orientation detected by the orientation detection sensor 60 is output to the MPU 101.

A proximity sensor 70 is disposed near a member that holds the ocular lens 31, and detects when the user's face is near the viewfinder 33. In other words, the proximity sensor 70 detects whether or not the user is looking into the viewfinder of the camera body 100. An infrared light projecting/receiving sensor can be used for the proximity sensor 70. An output signal from the proximity sensor 70 is output to the MPU 101.

The MPU 101 obtains a state of the lens unit 200 via the mount contact point 21 (here, the "state" refers to at least one of an F number, the focal length, and the focal state), and also obtains an orientation signal (orientation information) from the orientation detection sensor 60. This information will be called the "state of the image capturing system" hereinafter.

Figure 2:
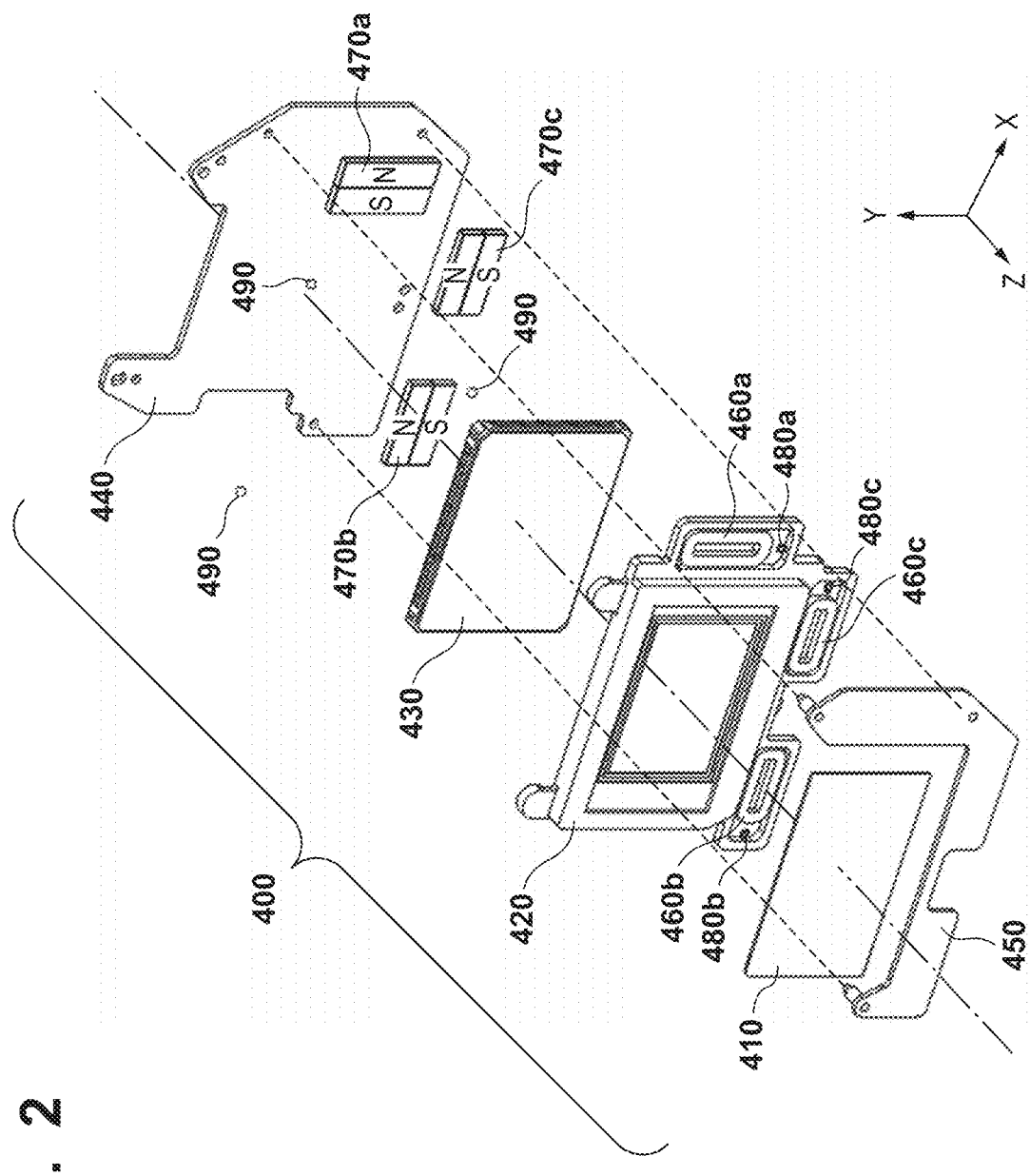
FIG. 2 is an exploded perspective view of an image sensor unit according to embodiments.

The configuration of the image sensor unit 400 will be described next with reference to FIG. 2. FIG. 2 is an exploded perspective view of the image sensor unit 400. The image capturing optical axis is defined as a Z axis, an axis in the horizontal direction orthogonal to the Z axis is defined as an X axis, and an axis in the vertical direction orthogonal to both the Z axis and the X axis is defined as a Y axis. The positional relationships between the units will be described assuming that a subject side corresponds to a forward side. To correct image blur in the X direction, the Y direction, and the direction of rotation about the optical axis (the roll direction), the image sensor unit 400 can move the image sensor 430 in each of those directions. The optical low-pass filter 410 is a single birefringent plate, formed as a rectangle from crystal, and is disposed on the forward side of the image sensor 430.

A shift holder 420 is a mobile member that holds the optical low-pass filter 410 and the image sensor 430 and is capable of moving in the X direction, the Y direction, and the roll direction. The image sensor 430 is fixed to the shift holder 420 by a fastening member (not shown), or with an adhesive. A shift base 440 constitutes part of a base member of the image sensor unit 400, and is disposed on the rear side of the image sensor 430. A front base 450 is a member which is substantially L-shaped when viewed from the front, and is disposed on the side of the shift holder 420 opposite from the side on which the shift base 440 is disposed (i.e., the forward side). The shift base 440 and the front base 450 are formed from a soft magnetic material such as iron. Part of the front base 450 is linked to the shift base 440, and is integrated with the shift base 440. In other words, the shift base 440 and the front base 450 constitute the base member (fixing member) of the image sensor unit 400, and support the mobile member in a mobile state. The shift base 440 is fastened to a main part of the camera body 100.

As the driving coil 460 indicated in FIG. 1, an X direction driving coil 460a and Y direction driving coils 460b and 460c are provided. These coils are soldered to a flexible board (not shown) and are affixed to the shift holder 420 by an adhesive. The X direction driving coil 460a is disposed on a right side of the image sensor 430 when viewed from the front. The Y direction driving coils 460b and 460c are disposed on a lower side of the image sensor 430, symmetrically with respect to a YZ plane and with a predetermined gap between the coils in the X direction. Along with an X direction permanent magnet 470a and Y direction permanent magnets 470b and 470c, the X direction driving coil 460a and the Y direction driving coils 460b and 460c constitute an electromagnetic driving unit of the image sensor unit 400.

The X direction permanent magnet 470a and the Y direction permanent magnets 470b and 470c are affixed to the shift base 440 by an adhesive. The N pole and the S pole of the X direction permanent magnet 470a are arranged in the X direction, whereas the N pole and the S pole of the Y direction permanent magnets 470b and 470c are arranged in the Y direction. The permanent magnets 470a, 470b, and 470c are disposed opposing the driving coils 460a, 460b, and 460c, respectively. Specifically, one side part of each driving coil always overlaps with the N pole of the corresponding permanent magnet with respect to the Z direction, and the other side of the driving coil always overlaps with the S pole of the corresponding permanent magnet with respect to the Z direction.

When the image stabilization driving circuit 109 electrifies the X direction driving coil 460a, a magnetic flux produced by the driving coil 460a and a magnetic flux produced by the X direction permanent magnet 470a interfere magnetically, which produces Lorentz force. The shift holder 420 attempts to move linearly in the X direction relative to the shift base 440, with the Lorentz force produced by the electromagnetic driving unit acting as thrust (driving force).

On the other hand, when the image stabilization driving circuit 109 electrifies the Y direction driving coils 460b and 460c, a magnetic flux produced by the driving coils 460b and 460c and a magnetic flux produced by the Y direction permanent magnets 470b and 470c interfere magnetically, which produces Lorentz force. The shift holder 420 attempts to move linearly in the Y direction relative to the shift base 440, with the Lorentz force produced by the electromagnetic driving unit acting as thrust (driving force). Furthermore, the Y direction thrusts produced in the driving coils 460b and 460c can be set to different values by individually adjusting the magnitude of the currents in the Y direction driving coils 460b and 460c. As a result, the shift holder 420 can be rotated relative to the shift base 440.

A position detection sensor 480a and position detection sensors 480b and 480c are provided as the position detection sensor 480 illustrated in FIG. 1. The position detection sensor 480a is a Hall device, disposed near the X direction driving coil 460a, that detects X direction displacement of the mobile member, including the shift holder 420. On the other hand, the position detection sensors 480b and 480c are Hall devices, disposed near respective ones of the Y direction driving coils 460b and 460c, that detect Y direction displacement of the mobile member, including the shift holder 420. Each of the position detection sensors 480a, 480b, and 480c is disposed near the magnetization boundary of the corresponding opposing permanent magnet, is soldered to a flexible board or the like (not shown), and is affixed to the shift holder 420 by an adhesive. Each of the position detection sensors 480a, 480b, and 480c outputs an electrical signal corresponding to a change in the magnetic flux produced from the corresponding opposing permanent magnet.

A plurality of balls 490 are rolling members held between the shift holder 420 and the shift base 440, and in the example illustrated in FIG. 2, three balls are used. Each of the balls 490 contacts holding parts (not shown) formed in the shift holder 420 and the shift base 440, and are capable of rolling as the shift holder 420 moves relative to the shift base 440. The shift holder 420 is biased toward the shift base 440 by a magnetic attraction member or an elastic member. Accordingly, each of the balls 490 can be held between the shift holder 420 and the shift base 440 in a compressed state.

Image stabilization operations by the image sensor unit 400 having the aforementioned configuration will be described next. When the camera body 100 is shaken due to the user's hand shaking or the like, angular shake and rotational shake arise with respect to the optical axis of the imaging optical system. As such, the image stabilization operations cancel out image shake by moving the image sensor 430 in the direction opposite from the direction in which the image shake is occurring.

When image stabilization operations are turned on using the image stabilization setting SW 42, and hand shake has arisen in the camera body 100 in at least one of the X direction, the Y direction, and the roll direction, the outputs of the shake detection sensor 50 in each of the directions are integrated, and an angular shake amount is calculated for each of the directions. The angular shake amount calculated for each direction is sent to the MPU 101.

The MPU 101 then calculates target values for controlling the movement of the image sensor 430, which is required to correct the image blur, on the basis of the angular shake amounts from the shake detection sensor 50. These target values correspond to target positions in the X direction, the Y direction, and the roll direction. The MPU 101 calculates a shake correction amount for moving the image sensor 430 to the position corresponding to the calculated target values, and outputs that shake correction amount to the image stabilization driving circuit 109. In accordance with the shake correction amount from the MPU 101, the image stabilization driving circuit 109 controls the electrification of the X direction driving coil 460a and the Y direction driving coils 460b and 460c in order to move the image sensor 430 to the target position.

The position detection sensor 480 calculates a position of the mobile member including the image sensor 430. In other words, detection signals for the X direction displacement, the Y direction displacement, and the roll direction rotational displacement of the image sensor 430 are sent to the MPU 101. The MPU 101 compares the target position corresponding to the target values for the X direction, the Y direction, and the roll direction with a detected position of the image sensor 430 detected by the position detection sensor 480. The MPU 101 outputs a control signal to the image stabilization driving circuit 109 so as to reduce a difference between the target position and the detection position. As a result of this feedback control, the image sensor 430 moves toward the target position, which suppresses image blur.

Note that the image stabilization in the rotation direction (the roll direction) may be carried out using a known technique. For example, a first angular shake amount is calculated through a process which adds the angular shake amount in the Y direction to the angular shake amount in the roll direction. A second angular shake amount is calculated through a process which subtracts the angular shake amount in the roll direction from the angular shake amount in the Y direction. Feedback control is carried out for the driving coil 460b so as to eliminate a difference between the first angular shake amount obtained in this manner and the position detected by the position detection sensor 480b. Furthermore, feedback control is carried out for the driving coil 460c so as to eliminate a difference between the second angular shake amount and the position detected by the position detection sensor 480c.

Operations carried out by the camera body 100 according to the present embodiment when image stabilization is on will be described next with reference to the flowchart in FIG. 3. First, in step S101, the MPU 101 determines whether or not an operation for turning the power SW 43 on has been made. The determination process of step S101 is repeated until an operation for turning the power SW 43 has been made. Once the user has made an operation for turning the power SW 43 on, and the power is turned on, the process moves to step S102.

In step S102, the MPU 101 executes a process for starting up the image capturing system (system on operations). Specifically, power is supplied to the various circuits, and initial system settings, system operations for enabling shooting operations, and the like are carried out. Also in step S102, communication is carried out with the lens control circuit 202 to obtain the lens information unique to the lens unit, i.e., the image circle center position information, the image circle diameter information, the information of the highest-resolution position, and the resolution distribution information, which is recorded in the EEPROM 206. The obtained information is stored in the DRAM 116.

In step S103, the MPU 101 obtains the state of the image capturing system, and using the lens information obtained in step S102, calculates a position to serve as a reference during stabilization control of the image sensor 430 (a reference position) on the basis of the obtained state of the image capturing system. Then, in response to a control signal from the MPU 101, the image stabilization driving circuit 109 controls the electrification of the X direction driving coil 460a and the Y direction driving coils 460b and 460c, and moves the image sensor 430 so that a center position of the image sensor 430 coincides with the reference position.

The concepts of the state of the image capturing system and the movement of the center position of the image sensor 430 will be described here with reference to FIGS. 4A, 4B, 5, and 6. The "state of the image capturing system" is information obtained by the MPU 101, such as the camera orientation, the F number, the focal length, the focal state, and the like. Here, however, only the camera orientation will be described as an example, for the sake of simplicity.

Figure 4A:
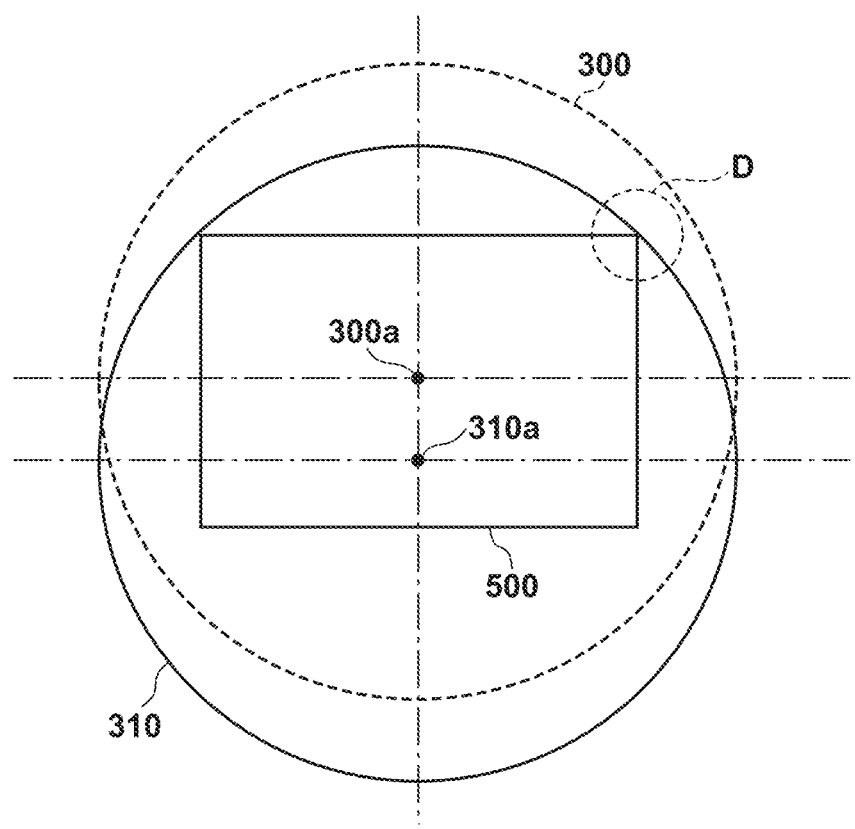
FIG. 4A is a schematic diagram illustrating a relationship between an image circle of a lens and an image capturing region.
Figure 5:
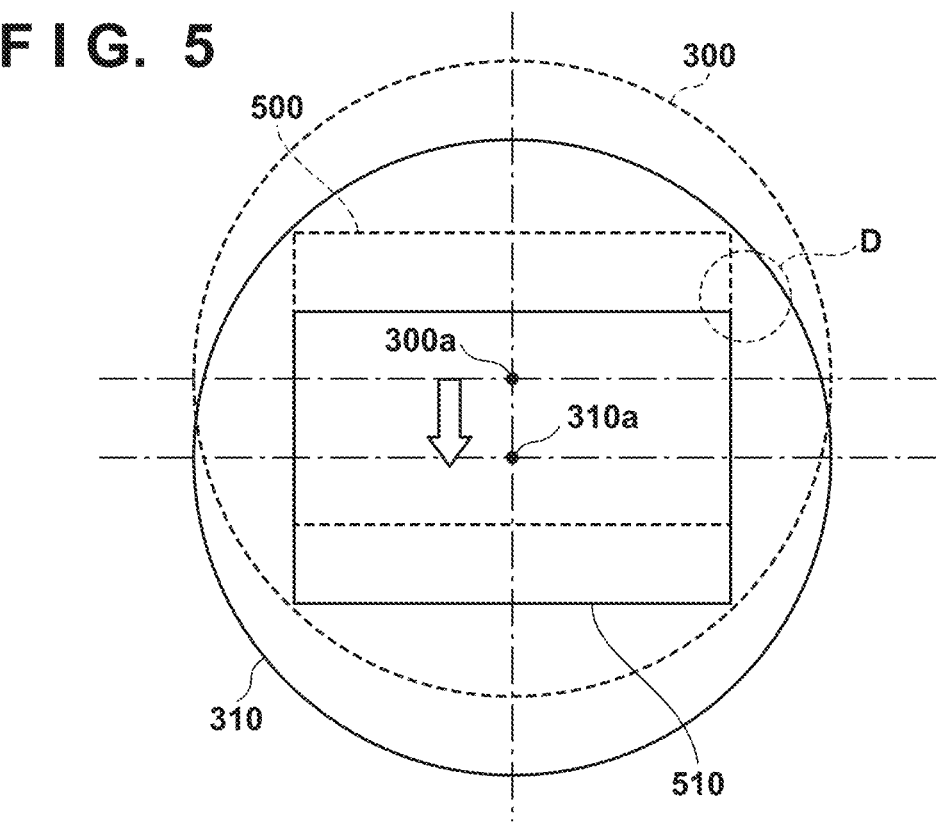
FIG. 5 is a schematic diagram illustrating a relationship between an image circle of a lens and an image capturing region according to embodiments.
Figure 6:
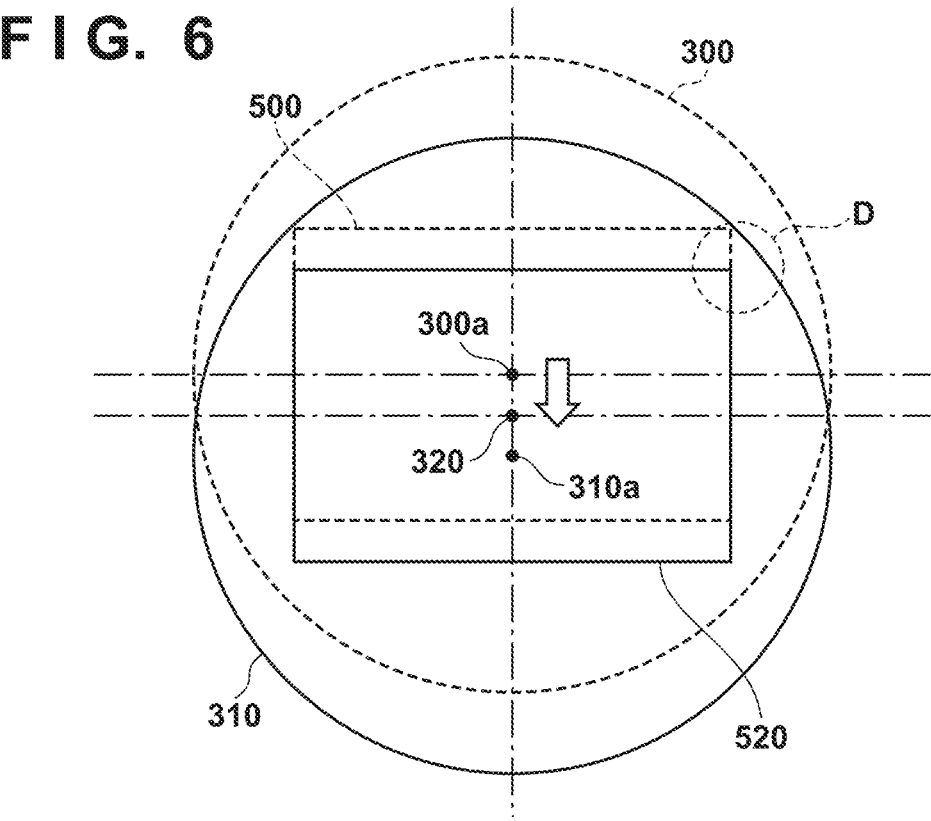
FIG. 6 is a schematic diagram illustrating a relationship between an image circle of a lens and an image capturing region according to embodiments.

FIGS. 4A, 5, and 6 are schematic diagrams illustrating examples of a positional relationship between the image circle of the lens unit 200 and an image capturing region of the image sensor 430. The position and size of the image circle can be obtained from the image circle center position information and the image circle diameter information included in the lens information, and differ depending on the lens unit. Accordingly, the positional relationship described below is merely an example, and differs depending on the lens unit 200.

In FIG. 4A, 300 indicates the image circle of the lens unit 200 when the orientation of the camera body 100 corresponds to the upright position. As one example, the center of an image capturing region 500 of the image sensor 430 (i.e., the center of the image sensor 430) is assumed to coincide with a center 300a of the image circle 300 (i.e., the optical axis of the lens 201 when in the upright position).

Figure 4B:
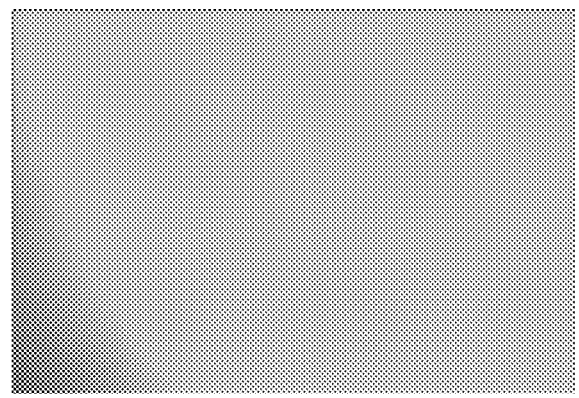
FIG. 4B is a diagram illustrating an example of an image captured when shooting a solid surface having a uniform brightness after moving an image sensor to correct image blur in a situation as illustrated in FIG. 4A.

Here, when the orientation of the camera body 100 is changed from the upright position to a vertical position rotated 90° to the right, the image circle moves to the position indicated by 310. The image circle moves because the lens 201 in the imaging optical system moves depending on the camera orientation, due to manufacturing error, looseness, and so on in the lens. However, the image capturing region 500 does not move, and thus a corner part D of the image capturing region 500 will approach an outer edge part of the image circle 310. This reduces the leeway available for moving the image sensor 430 in order to correct image blur. In this state, if, when viewed from the front, the image sensor 430 is moved to the right in order to correct image blur, the corner part D will exit the image circle 310. FIG. 4B illustrates an example of a shot image obtained when shooting a solid surface having a uniform brightness at this time. As illustrated in FIG. 4B, a sufficient amount of light cannot be obtained at the corner part D, and thus the part of the shot image corresponding to the corner part D appears dark. Although this problem can be solved by making the image circle larger, doing so has the disadvantage of increasing the size of the interchangeable lens unit.

Accordingly, in the present embodiment, when the image circle moves as described above in response to changes in the orientation, the image capturing region 500 is moved to an image capturing region 510 on the basis of lens information based on orientation detection signals from the orientation detection sensor 60, as illustrated in FIG. 5. As a result, the center of the image capturing region 510 (i.e., the center of the image sensor 430) is caused to approach, and coincide with, a center 310a of the image circle 310 (i.e., the optical axis of the lens 201 when in the vertical position rotated 90° to the right). Doing so provides leeway in terms of the distance from the image capturing region 510 to the outer edge part of the image circle 310 at the corner part D of the image capturing region 510. In this state, even if, when viewed from the front, the image sensor 430 is moved to the right in order to correct image blur, the corner part D will not exit the image circle 310. This makes it possible to obtain a favorable image without darkness at the corner part D of the shot image.

Although the foregoing describes causing the center of the image capturing region to coincide with the optical axis of the lens 201, it is not absolutely necessary to do so. The center of the image capturing region need not coincide with the optical axis of the lens 201, as long as the image capturing region is within the range of the image circle and there is leeway in terms of the movement range of the image sensor for the purpose of correcting image blur. For example, the center of the image capturing region can be caused to coincide with a point, in the image circle, having the highest resolution in a variety of orientations.

Accordingly, when information corresponding to the state of the image capturing system is included in the lens information obtained from the lens unit 200, that lens information can be used to reduce vignetting, improve the definition, and so on when correcting image blur.

However, the camera orientations include not only the upright position and vertical positions, but a variety of other orientations, such as a state where the lens is pointed downward, a pitched state, an intermediate position between the upright position and a vertical position, and so on. It is not realistic to hold lens information for all of those orientations. This is because while the lens information is obtained during the manufacturing process, it takes an extremely large number of steps to obtain lens information for a variety of orientations, and that number exceeds a defined number of steps.

Thus when it is determined, on the basis of the orientation detection signal from the orientation detection sensor 60, that the camera orientation corresponds to a vertical position, and information satisfying a set condition cannot be obtained while in that orientation, the image capturing region 500 is moved to a predetermined image capturing region 520 in the present embodiment, as illustrated in FIG. 6. Although details will be given later, in the present embodiment, a plurality of positions are prepared in advance as image capturing region positions, and one of those positions is selected in accordance with a variety of conditions. Not being able to obtain information satisfying a set condition, mentioned above, refers to a situation where there is no lens information for the orientation in question, a situation where it is not appropriate to estimate information corresponding to that orientation through a method such as interpolation or extrapolation from existing information, or the like. This state will be called a "state not satisfying a set condition" hereinafter, and conversely, a state where lens information based on that orientation can be obtained from the lens information will be called a "state satisfying a set condition".

The center of the image capturing region 520 (i.e., the center of the image sensor 430) at this time is determined using information aside from the lens information obtained from the lens unit 200. For example, the center of the image capturing region 520 is caused to coincide with a center 320 of the mount part 120 of the camera body 100. Doing so provides leeway between the outer edge part of the image circle 310 and the image capturing region 520 at the corner part D of the image capturing region 520. In this state, even if, when viewed from the front, the image sensor 430 is moved to the right in order to correct image blur, the corner part D will not immediately exit the image circle 310. The mount part 120 serves as a reference for adjusting the position of the image sensor 430. Thus when orientation has changed, moving the image capturing region to the image capturing region 520 produces more leeway in the range over which the image sensor 430 can be moved for the purpose of correcting image blur than keeping the image capturing region at the image capturing region 500 in the upright position.

The center of the opening in the shutter unit 32 is conceivable as an example aside from the center of the mount part 120, when there is no leeway with respect to the opening in the shutter unit 32 (the opening through which light beams pass from the lens 201 toward the image sensor 430), for example. Additionally, when exposure control is carried out using an electronic front curtain and rear curtain of the shutter unit 32, at a high shutter speed (an exposure time of less than or equal to $1/1000$ sec), a position at which a curve of the electronic front curtain is adjusted is conceivable as well. In a moving image mode, the center of a movement range defined by the driving coil 460 and the permanent magnet 470 corresponds to the center of the image capturing region 520 at which the stabilization range can be increased the most, and thus the image capturing region is moved to that position. Using the center of the movement range defined by the driving coil 460 and the permanent magnet 470 as the reference position makes it possible to set the movement range of the image sensor 430 for the purpose of correcting image blur to a broader range. Even when not in a moving image mode, it is favorable to use the center of the movement range as the reference position when using settings which prioritize a stabilization function (i.e., when using settings that can handle large degrees of blur). Note that an example of circumstances under which the center of the image sensor 430 is moved to these positions will be described later with reference to FIG. 9.

The process for moving the center of the image sensor 430, carried out in step S103 of FIG. 3, will be described next with reference to the flowchart in FIG. 7. In step S121, the MPU 101 obtains the orientation detection signal from the orientation detection sensor 60, as well as the state of the image capturing system, which includes the F number, the focal length, the focal state, and so on of the lens unit 200, via the mount contact point 21.

In step S122, it is determined whether or not the lens information in the detected state of the image capturing system corresponds to the state satisfying a set condition. Specifically, the lens information loaded into the DRAM 116 in step S102 of FIG. 3 is referred to, and it is determined whether or not lens information based on the state of the image capturing system can be obtained as appropriate. The process moves to step S123 if the state is determined to be a state satisfying a set condition, and to step S124 if not. Note that even if the state of the image capturing system itself cannot be obtained in step S121, the process nevertheless moves to step S124 under the assumption that the state satisfying a set condition could not be obtained.

In step S123, the reference position for moving the center of the image sensor 430 is determined in accordance with the first determination method. Specifically, a position to which the center of the image sensor 430 is to be moved is obtained on the basis of the lens information obtained from the lens unit 200, as described with reference to FIG. 5. These operations will be described later in detail with reference to FIG. 8.

On the other hand, in step S124, the reference position for moving the center of the image sensor 430 is determined in accordance with the second determination method. Specifically, the reference position is determined using information aside from the lens information obtained from the lens unit 200, as described with reference to FIG. 6. These operations will be described later in detail with reference to FIG. 9.

Figure 3:
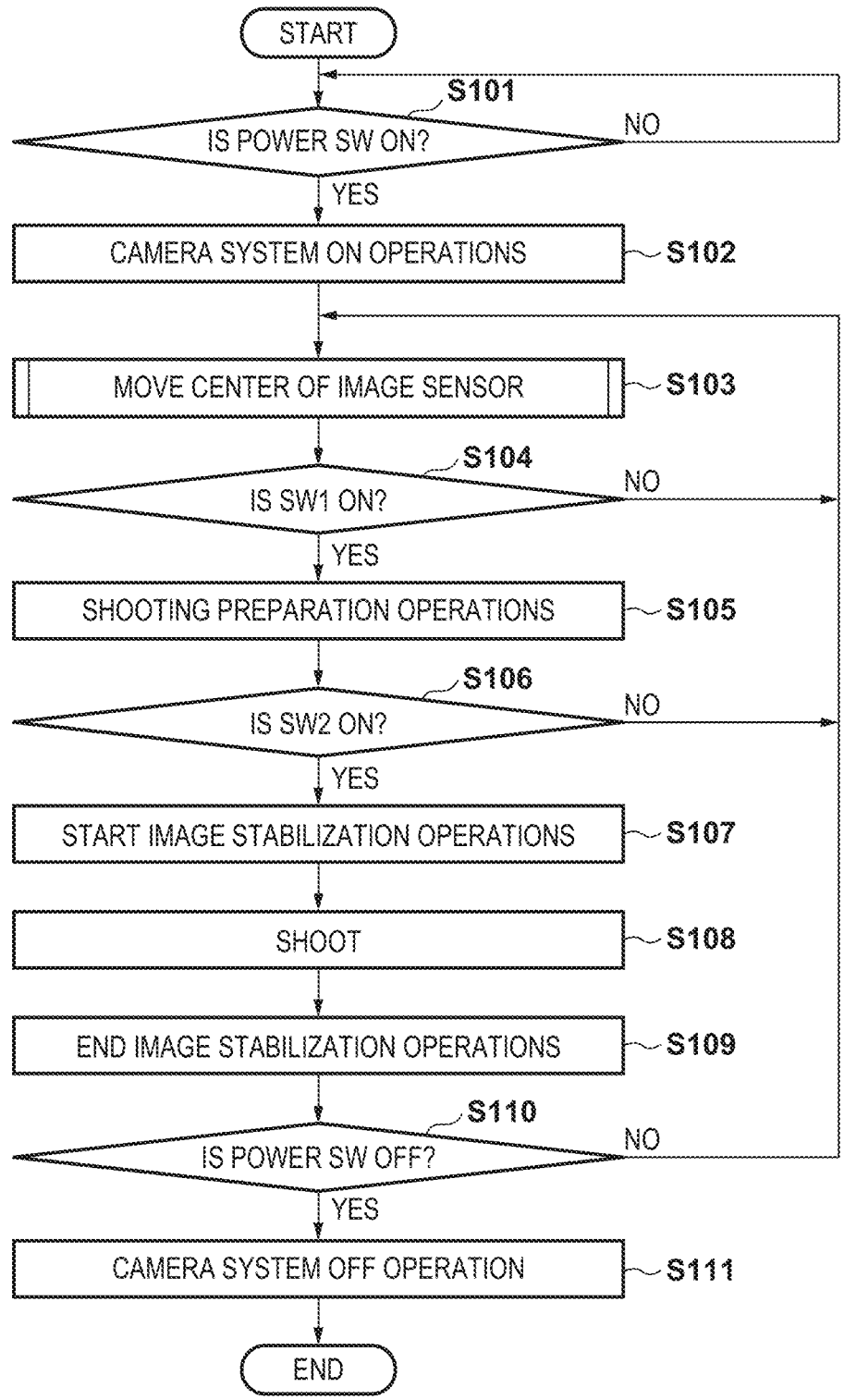
FIG. 3 is a flowchart illustrating operations of an image capturing apparatus according to embodiments.

In step S125, the center of the image sensor 430 is moved to the reference position determined in accordance with the first determination method or the second determination method, after which the process returns to FIG. 3.

Figure 7:
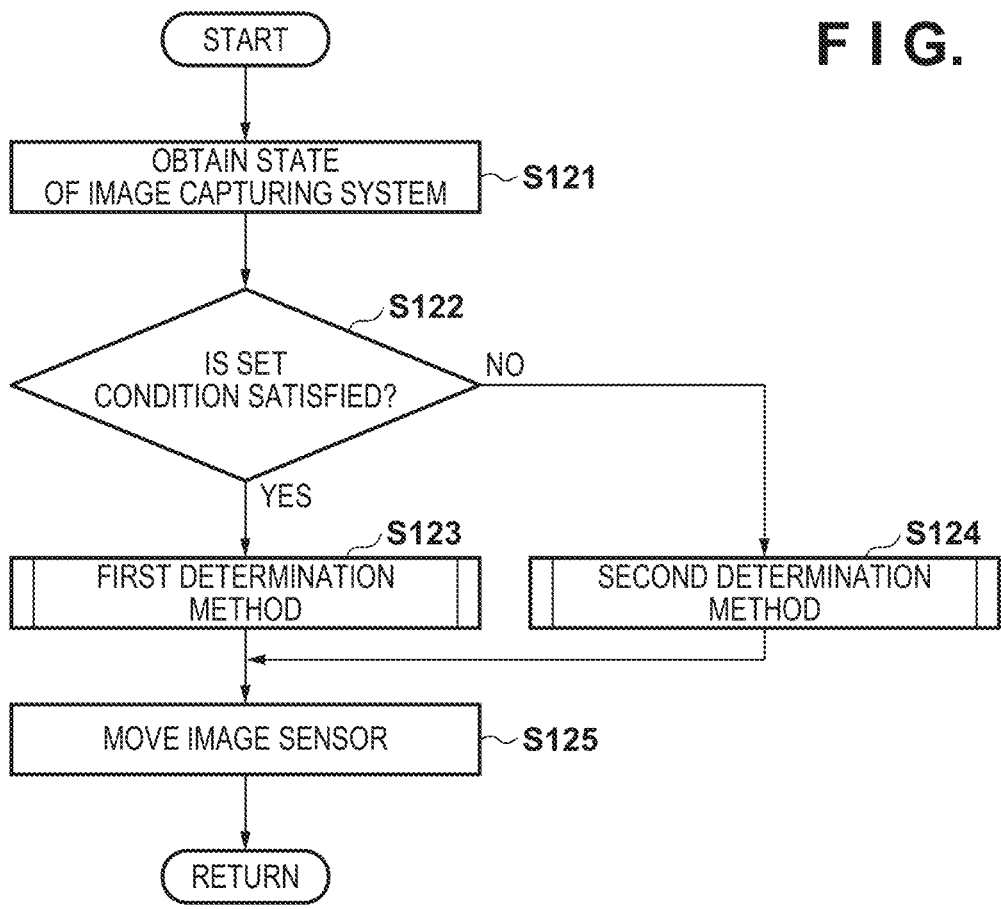
FIG. 7 is a flowchart illustrating processing for moving the center of an image sensor according to embodiments.
Figure 8:
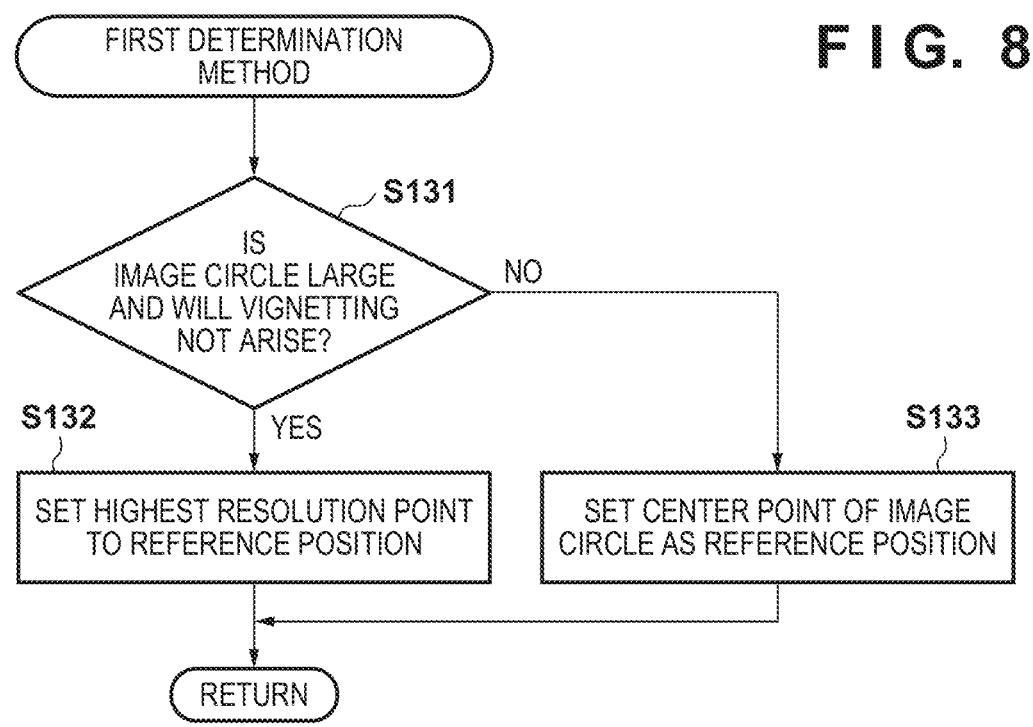
FIG. 8 is a flowchart illustrating operations in a first determination method according to embodiments.

FIG. 8 is a flowchart illustrating processing according to the first determination method carried out in step S123 of FIG. 7. First, in step S131, it is determined whether or not there is leeway in terms of the size of the image circle, and whether or not the vignetting problem will arise if the image sensor 430 is subjected to stabilization driving, using the center position of the image sensor 430 while in the upright position as the reference position, for the purpose of correcting image blur. In other words, if the movement range of the image sensor does not fall outside of the image circle, the process moves to step S132, whereas if even part of the movement range falls outside of the image circle, the process moves to step S133. In step S132, the reference position is set to the point where the resolution is the highest. On the other hand, in step S133, the center of the image circle is set as the reference position. The process returns to FIG. 7 after the reference position is set in step S132 or step S133.

Figure 9:
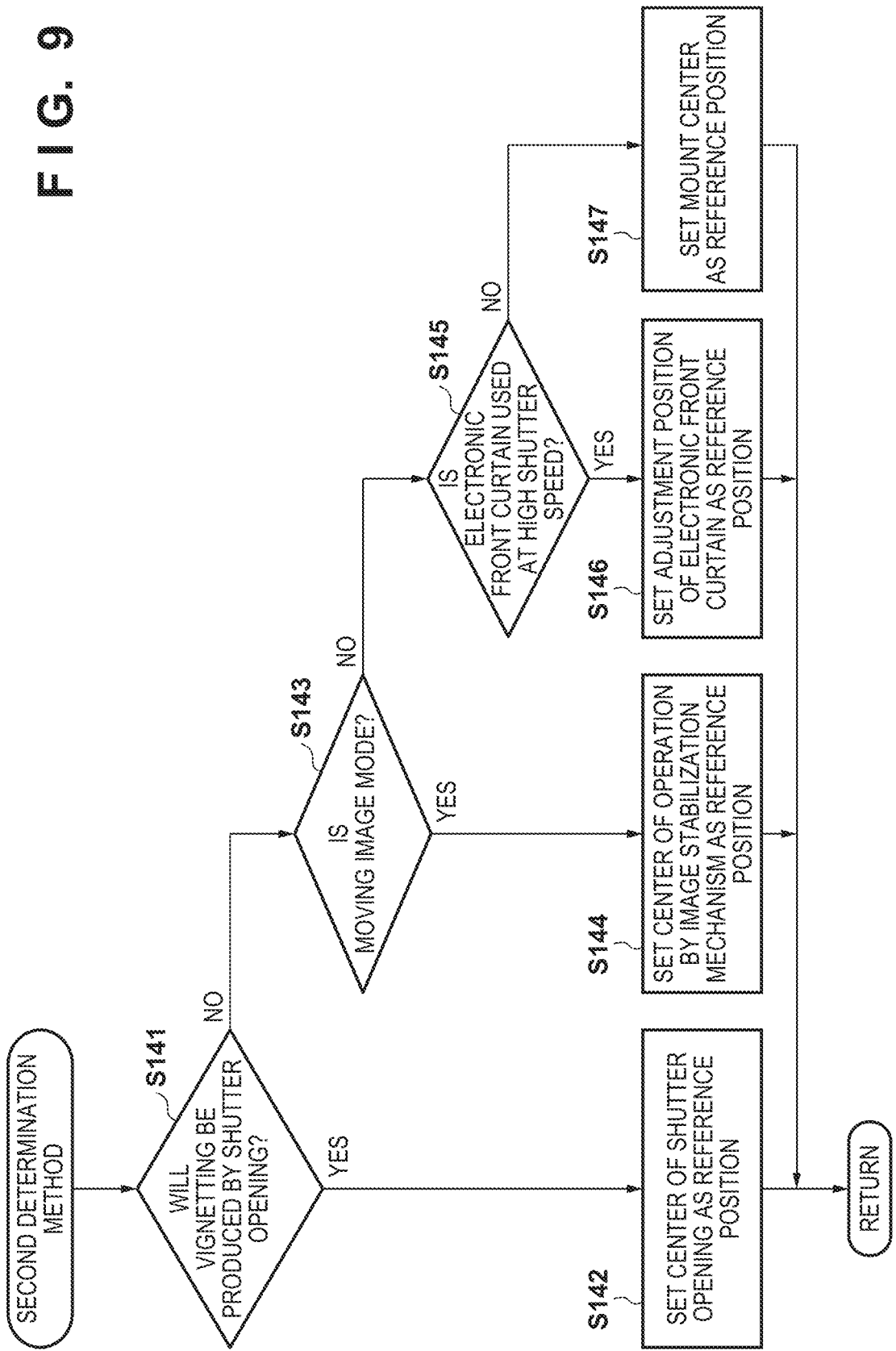
FIG. 9 is a flowchart illustrating operations in a second determination method according to embodiments.

FIG. 9 is a flowchart illustrating processing according to the second determination method carried out in step S124 of FIG. 7. First, in step S141, it is determined whether or not the boundary of the opening in the shutter unit 32 will produce vignetting in part of the movement range of the image sensor 430. If, during stabilization driving of the image sensor 430 for the purpose of correcting image blur, the boundary of the opening in the shutter unit 32 will produce vignetting in part of the movement range of the image sensor 430, darkness may arise in part of the obtained image, as illustrated in FIG. 4B. Although this situation can be avoided by broadening the boundary of the opening in the shutter unit 32, doing so is problematic in that it increases the size of the camera as a whole. Accordingly, if the boundary of the opening in the shutter unit 32 will produce vignetting, the process moves to step S142, where the center of the opening in the shutter unit 32 is set as the reference position. If no vignetting will occur, the process moves to step S143.

In step S143, it is determined whether or not the camera is in the moving image mode. Moving images are often shot while the photographer is moving, and are therefore likely to have a greater amount of blur than still images. Accordingly, when the camera is in the moving image mode, the process moves to step S144, where the center of a drive range used by the image stabilization mechanism unit is set as the reference position. Using such settings makes it possible to maximize the amount which the image stabilization mechanism unit can use for the purpose of correcting image blur, which makes it possible to handle situations where there is a large amount of blur. The process moves to step S145 if the camera is in a still image mode.

In step S145, it is determined whether or not the shooting is using an electronic front curtain and is being carried out at a high shutter speed. The process moves to step S146 if the shooting is using an electronic front curtain and is being carried out at a high shutter speed, and to step S147 if not. Note that "high shutter speed" refers to a situation where the exposure time is shorter than a predetermined value (e.g., 1/1000 sec). When shooting using an electronic front curtain, the front curtain is implemented through reset operations, and thus the reset position moves on the image sensor 430. On the other hand, with the rear curtain, the rear curtain blades of the shutter unit 32 move, and thus if the position of the image sensor 430 is shifted in the travel direction of the shutter, a shift arises in the exposure as well. The exposure time is already short at high shutter speeds in particular (the slit width in so-called "slit travel" is narrow), and thus changes in the position of the image sensor 430 are more likely to affect an image in such situations. This is because the amount of the shift accounts for a large proportion of the exposure time, which makes it easier for the number of exposure steps to become shifted. Accordingly, in step S146, the reference position is set to a position at which a reset curve of the electronic front curtain (a curve indicating the timing of a front curtain curve aligned with the rear curtain) is adjusted. This makes it possible to reduce exposure error.

On the other hand, in step S147, the center of the mount part 120 is set as the reference position. The center of the mount part 120 serves as a reference for adjusting a variety of functions, and is therefore suited to camera functions such as AF, AE, and the like in many situations. In the present embodiment, if the state satisfying a set condition could not be obtained (NO in step S122), the information used in the second determination method is determined from a plurality of pieces of information, in accordance with conditions of the image capturing apparatus, as illustrated in FIG. 9. However, these processes may be simplified, so that the information used in the second determination method is not changed in accordance with conditions of the image capturing apparatus. For example, the center of the mount may always be set as the reference position if a determination of NO is made in step S122. Additionally, in the above-described second determination method, the reference position is set on the basis of information of the image capturing apparatus (the center of the opening in the shutter, the center of operations of driving units, the position of the adjustment of the electronic front curtain, the center of the mount, and so on). However, the reference position may be determined in advance for situations where the state satisfying a set condition cannot be obtained. In such a case, a position to serve as the reference position in a situation where the state satisfying a set condition cannot be obtained (a first position) is determined in advance. Then, if a determination of NO is made in step S122, the first position is set as the reference position on the basis of information indicating the first position. In other words, if the state is one in which corresponding lens information can be obtained from the lens information stored in the EEPROM 206 (e.g., a first orientation), a determination of YES is made in step S122, and the reference position is set on the basis of the corresponding lens information. On the other hand, if the state is one in which the corresponding lens information cannot be obtained (e.g., a second orientation), a determination of NO is made in step S122, and the first position is set as the reference position.

Once the reference position is determined in the manner described above, and the center position of the image sensor 430 is moved to the determined reference position, the process moves to step S104 in FIG. 3.

In step S104, the MPU 101 determines whether or not the first switch SW1 (41a) of the release SW 41 has turned on. When the first switch SW1 (41a) is turned on, the process moves to step S105. However, the process returns to step S103 if the first switch SW1 is not turned on.

In step S105, the MPU 101 carries out shooting preparation operations. The shooting preparation operations are known operations such as moving the focus lens to an in-focus position on the basis of a focus detection result, calculating an exposure value by carrying out photometry computations, and so on, and will therefore not be described in detail here.

In step S106, the MPU 101 determines whether or not the second switch SW2 (41b) of the release SW 41 has turned on. When the second switch SW2 (41b) is turned on, the process moves to step S107. However, if the second switch SW2 (41b) is not operated, and the second switch SW2 (41b) is detected as being off, the process returns to step S103.

In step S107, image stabilization operations are started. Specifically, the image stabilization driving circuit 109 controls the electrification of the X direction driving coil 460a and the Y direction driving coils 460b and 460c in response to control signals from the MPU 101. The image stabilization operations are carried out by moving the image sensor 430 in a direction opposite from the direction of image blur caused by hand shake or the like. Next, in step S108, the MPU 101 carries out exposure control for the image sensor 430 by controlling the shutter unit 32 and the aperture stop 205 on the basis of the calculated exposure value. Once the exposure of the image sensor 430 ends, the image stabilization operations end in step S109. This completes the series of shooting operations.

Note that when in the moving image mode, it is determined whether or not to start shooting a moving image in step S106, and the moving image is shot in step S108. When the moving image shooting ends, the image stabilization operations end in step S109.

In step S110, the MPU 101 determines whether or not the power SW 43 has been turned off while the image capturing system is in a standby state. If the power SW 43 has been turned off, the process moves to step S111, whereas if the power SW 43 has not been turned off, the process returns to step S103. In step S111, the MPU 101 carries out control for ending the operations of the various circuits in the image capturing system, storing necessary information and the like in the EEPROM 115, and cutting off the supply of power to the various circuits (operations for turning the system off).

A concept of the lens information stored in the EEPROM 206 of the lens unit 200, and the state satisfying a set condition, will be described here in further detail with reference to FIGS. 10A to 10C. FIGS. 10A to 10C are schematic diagrams illustrating the lens information of a zoom lens having a maximum F number of 4.0 and a focal length that changes between 24 mm and 105 mm, for example.

FIG. 10A is a table of the lens information for a situation where the orientation of the camera corresponds to the upright position; FIG. 10B is a table of the lens information for a situation where the orientation corresponds to a vertical position rotated 90° to the right; and FIG. 10C is a table of the lens information for a situation where the orientation corresponds to a vertical position rotated 90° to the left. In the examples illustrated in FIGS. 10A to 10C, lens information corresponding to three types of focal lengths (24 mm, 50 mm, and 105 mm) and four types of F numbers (F4.0, F5.6, F8.0, and F11) is present. Design values or values measured in consideration of individual differences are recorded in the EEPROM 206 as such lens information. As described earlier, due to the manufacturing processes, the capacity of the EEPROM 206, and so on, lens information such as that illustrated in FIGS. 10A to 10C is not obtained for all focal lengths, F numbers, and camera orientations. In the examples illustrated in FIGS. 10A to 10C, the information is of only three types of orientations, three types of focal lengths, and four types of F numbers, as representative types of information. Each instance of the lens information (PN11 to PN43, PR11 to PR43, and PL11 to PL43) includes the image circle center position information, the image circle diameter information, the information of the highest-resolution position, the resolution distribution information, and the like, as described above.

Here, if, for example, the upright position, a focal length of 50 mm, and an F number of 4.0 has been obtained as the state of the image capturing system, information indicated by PN12 is obtained from the upright position table illustrated in FIG. 10A.

Additionally, assume that, for example, the upright position, a focal length of 35 mm, and an F number of 4.0 have been obtained as the state of the image capturing system. In this case, it is thought that a sufficiently good approximation can be obtained by interpolating the information of PN11, i.e., the upright position, a focal length of 24 mm, and an F number of 4.0, and the information of PN12, i.e., the upright position, a focal length of 50 mm, and an F number of 4.0, from the table for the upright position illustrated in FIG. 10A. Accordingly, when the state of the image capturing system matches a state held in the lens information illustrated in FIGS. 10A to 10C, and the state can be approximated, that state is taken as the state satisfying a set condition. When the state satisfies a set condition in this manner (YES in step S122 of FIG. 7), the reference position is determined through the first determination method (step S123).

On the other hand, if, for example, the orientation is one in which the lens is pointing downward, a suitable reference position cannot be found through interpolation using the lens information for the upright position, the vertical position rotated 90° to the right, and the vertical position rotated 90° to the left, as illustrated in FIGS. 10A to 10C.

Furthermore, in the image capturing system according to the present embodiment, the lens unit 200 can be attached to and removed from the camera body 100. With such an image capturing system, it is conceivable, in addition to the aforementioned manufacturing process, EEPROM 206 capacity, and so on, that another lens unit which the user possesses does not have the lens information.

Such a state corresponds to a case where the set condition is not satisfied, and lens information according to the image capturing system cannot be obtained. In this case, (NO in step S122 of FIG. 7), the reference position is determined through the second determination method (step S124). Note that when a lens unit not having lens information is attached to the camera body 100, the corresponding lens information cannot be obtained no matter what orientation the camera is in, and thus the reference position is determined through the second determination method regardless of the orientation. In other words, in the present embodiment, there are cases where, depending on the attached lens unit, the state satisfying a set condition can or cannot be obtained, even when the orientation is the same (e.g., the upright position). Therefore, the reference position may be determined using the first determination method on one occasion and the reference position may be determined using the second determination method on another occasion even when the orientation is the same.

The timing at which the center of the image sensor 430 is moved when the state of the image capturing system has changed will be described next with reference to FIG. 3.

First, in step S103, the reference position is found, and the center of the image sensor 430 is moved, on the basis of the state of the image capturing system at the point in time when the power SW 43 is turned on. A captured subject image is then displayed in the screen of the color liquid crystal monitor 19 (a through-the-lens image display). To conserve power, if it is determined, on the basis of an output signal from the proximity sensor 70, that the user is looking through the viewfinder 33, the image is displayed in the screen of the eyepiece-based liquid crystal monitor 30 instead of the color liquid crystal monitor 19. The monitor display is carried out after first moving the center of the image sensor 430 to the target position, and thus the user will not notice the movement of the image sensor 430. In other words, the user will not notice any fluctuations in the angle of view, which has the advantage of allowing him or her to concentrate on taking the shot.

Then, if the state of the image capturing system has changed without the user turning SW1 on, the process returns to step S103, where the reference position is found again in accordance with the timing of change in the state of the image capturing system. The center of the image sensor 430 is then moved. The timing at which the state of the image capturing system has changed can be determined by the MPU 101 from an output signal from the shake detection sensor 50, an output signal from the orientation detection sensor 60, and through communication with the lens control circuit 202. Generally speaking, there is a little demerit to the user even if the center of the image sensor 430 is moved, and the angle of view changes as a result, in response to a change in the state of the image capturing system prior to the first switch SW1 (41*a*) turning on.

According to the present embodiment as described thus far, image stabilization in which the influence of vignetting is suppressed can be carried out in accordance with a variety of states in the image capturing system.

Second Embodiment

A second embodiment of the present invention will be described next with reference to FIG. 11. In the second embodiment, the timing at which the center of the image sensor 430 moves is different from that in the process illustrated in FIG. 3. Aside from this, the configuration of and processing carried out by the image capturing system is the same as in the first embodiment. Descriptions thereof will accordingly be omitted, and the following will focus only on the differences.

According to the second embodiment, in a state where the first switch SW1 (41*a*) is off, the center of the image sensor 430 is not moved even if the user makes various changes to the state of the image capturing system. Instead, the center of the image sensor 430 is moved after the first switch SW1 (41*a*) has turned on. FIG. 11 is a flowchart illustrating that process, and differs from the process illustrated in FIG. 3 in that the process for moving the center of the image sensor 430, carried out in step S103, is carried out in accordance with the state of the image capturing system at the point in time when the first switch SW1 (41*a*) has turned on in step S104. In other respects, the process is the same as that illustrated in FIG. 3, and will therefore not be described here.

Carrying out such control makes it possible to achieve the following effects, in addition to the effects described above in the first embodiment. First, in a state where the first switch SW1 (41*a*) is not on, the image sensor 430 need not be moved each time the state of the image capturing system changes. This makes it possible to keep the electrification of the driving coils to a minimum, which in turn reduces the amount of power consumed. This control is also useful for users who find it annoying when the angle of view changes each time the state of the image capturing system changes while the first switch SW1 (41*a*) is off. Furthermore, the movement of the center of the image sensor 430 in accordance with the state of the image capturing system need only be carried out once after the first switch SW1 (41*a*) has turned on.

On the other hand, the user is focusing on the image displayed in the color liquid crystal monitor 19 or the eyepiece-based liquid crystal monitor 30 after the first switch SW1 (41*a*) has turned on. The image sensor 430 is moved at that time, which means that the user may notice the angle of view fluctuating. However, by noticing fluctuations in the angle of view, the user can change the angle of view and recompose the shot before proceeding to turn the second switch SW2 (41*b*) on, which makes it possible to suppress the effect of the fluctuation in the angle of view on the shot image.

In the example illustrated in FIG. 11, the process for finding the reference position in step S103 and the process of moving the center of the image sensor 430 are carried out after the first switch SW1 (41*a*) turns on, but the present invention is not limited thereto. For example, control may be carried out so that the process for finding the reference position is carried out as needed before the first switch SW1 (41*a*) turns on, and after the first switch SW1 (41*a*) has turned on, the center of the image sensor 430 is moved to the reference position found immediately before.

Third Embodiment

A third embodiment according to the present invention will be described next. In the first embodiment, the center of a range of driving by the image stabilization mechanism unit is used as the reference position when the shooting mode is the moving image mode in the second determination method (YES in step S143), as illustrated in FIG. 9. As opposed to this, in a third embodiment, the center of the image sensor 430 is moved when the moving image mode is set. Aside from this, the configuration of and processing carried out by the image capturing system is the same as in the first embodiment. Descriptions thereof will accordingly be omitted, and the following will focus only on the differences.

Figure 12:
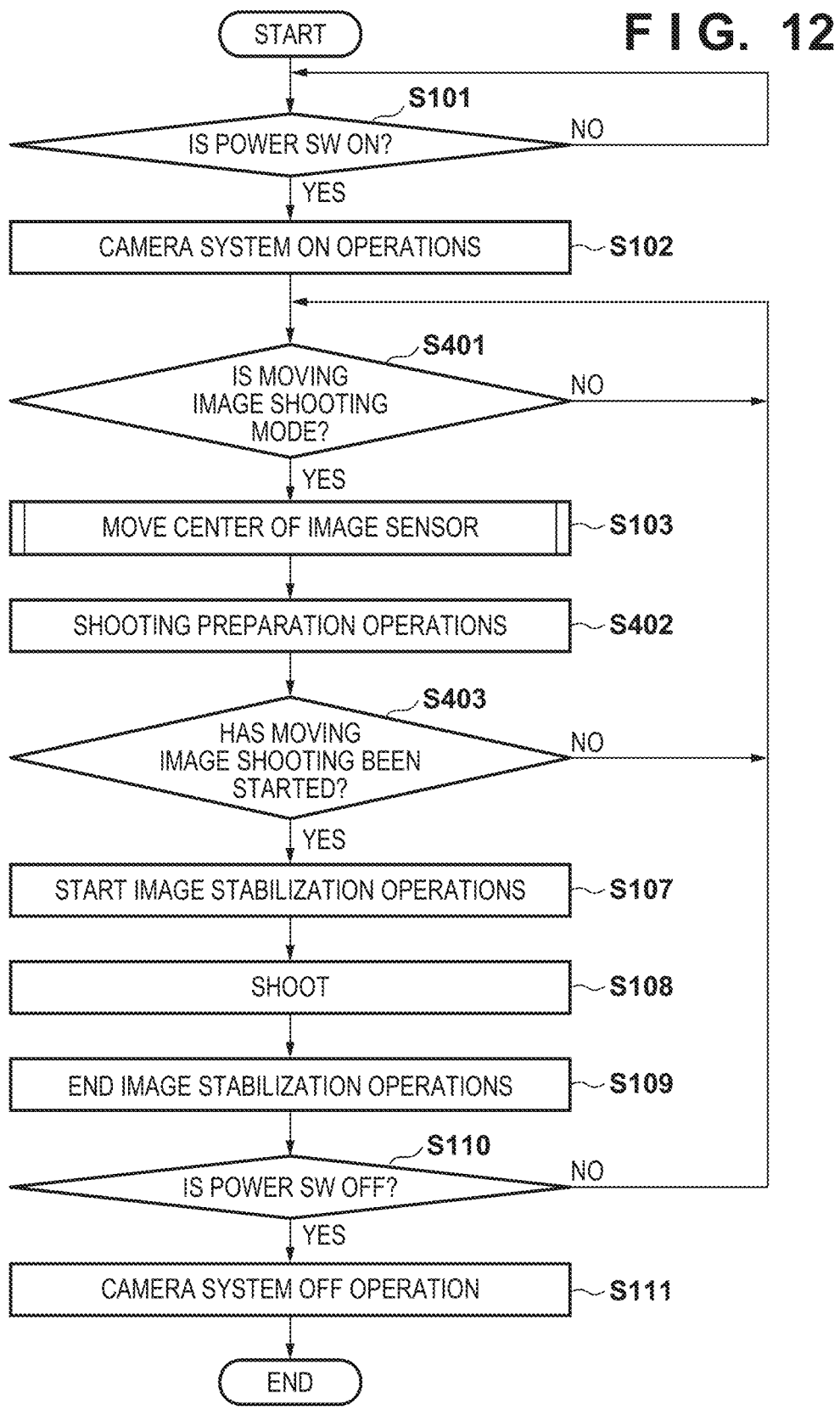
FIG. 12 is a flowchart illustrating operations of an image capturing apparatus according to a third embodiment.

FIG. 12 is a flowchart illustrating operations carried out by the camera body according to the third embodiment. Note that processes that are the same as those illustrated in FIG. 3 are given the same step numbers, and descriptions thereof will be omitted as appropriate.

In step S401, the MPU 101 determines whether or not the shooting mode setting dial 44 is set to the moving image mode. The process moves to step S103 if the moving image mode is set. In step S103, on the basis of the state of the image capturing system, the MPU 101 moves the image sensor 430 so that the center of the image sensor 430 coincides with the reference position, as described earlier with reference to FIGS. 7 to 9. Note that if the reference position is found through the second determination method, the determination in step S143 of FIG. 9 will always be YES, and thus the processing from step S145 to S147 is not carried out.

Note that as described above, moving images are more likely to have a greater amount of blur than still images, and thus when the moving image mode is set, the center of the range of driving by the image stabilization mechanism unit may always be set as the reference position, regardless of the lens information.

Then, in step S402, the MPU 101 controls the shooting preparation operations according to the moving image mode. In step S403, the MPU 101 determines whether or not moving image shooting has been started. The second switch SW2 (41b) of the release SW 41 being turned on is used here as an operation for starting moving image shooting. Of course, the present invention is not limited thereto. A separate moving image shooting switch may be provided, and whether moving image shooting has started or ended may be determined in response to the moving image shooting switch being operated. Aside from a moving image being shot in step S108, the processing from steps S107 to S111 is the same as that described with reference to FIG. 3.

Note that if the mode is determined not to be the moving image mode in step S401, the processing illustrated in FIG. 3 or FIG. 11 may be carried out.

By carrying out such control, the center of the image sensor 430 is moved at the timing at which the mode is changed from the still image mode to the moving image mode. This makes it possible to suppress the effects of fluctuations in the angle of view.

Note that even if the state of the image capturing system has been changed while a moving image is being shot in step S108 (e.g., the state has been changed from the upright position to a vertical position), the reference position is not changed. The change is instead made when the start of moving image shooting is determined in step S103. This is because if the center of the image sensor 430 is moved while shooting a moving image, the angle of view of the shot image will change suddenly, producing a sense of discontinuity in the moving image. Such a sense of discontinuity in the moving image greatly reduces the moving image quality, and thus the center of the image sensor 430 is not moved even if the state of the image capturing system has changed.

In this manner, control is carried out so that the image sensor is not moved if a fluctuation in the angle of view caused by the image sensor movement will greatly reduce the quality of the shot image. This makes it possible to carry out image stabilization which suppresses the effects of vignetting.

Fourth Embodiment

Figure 13:
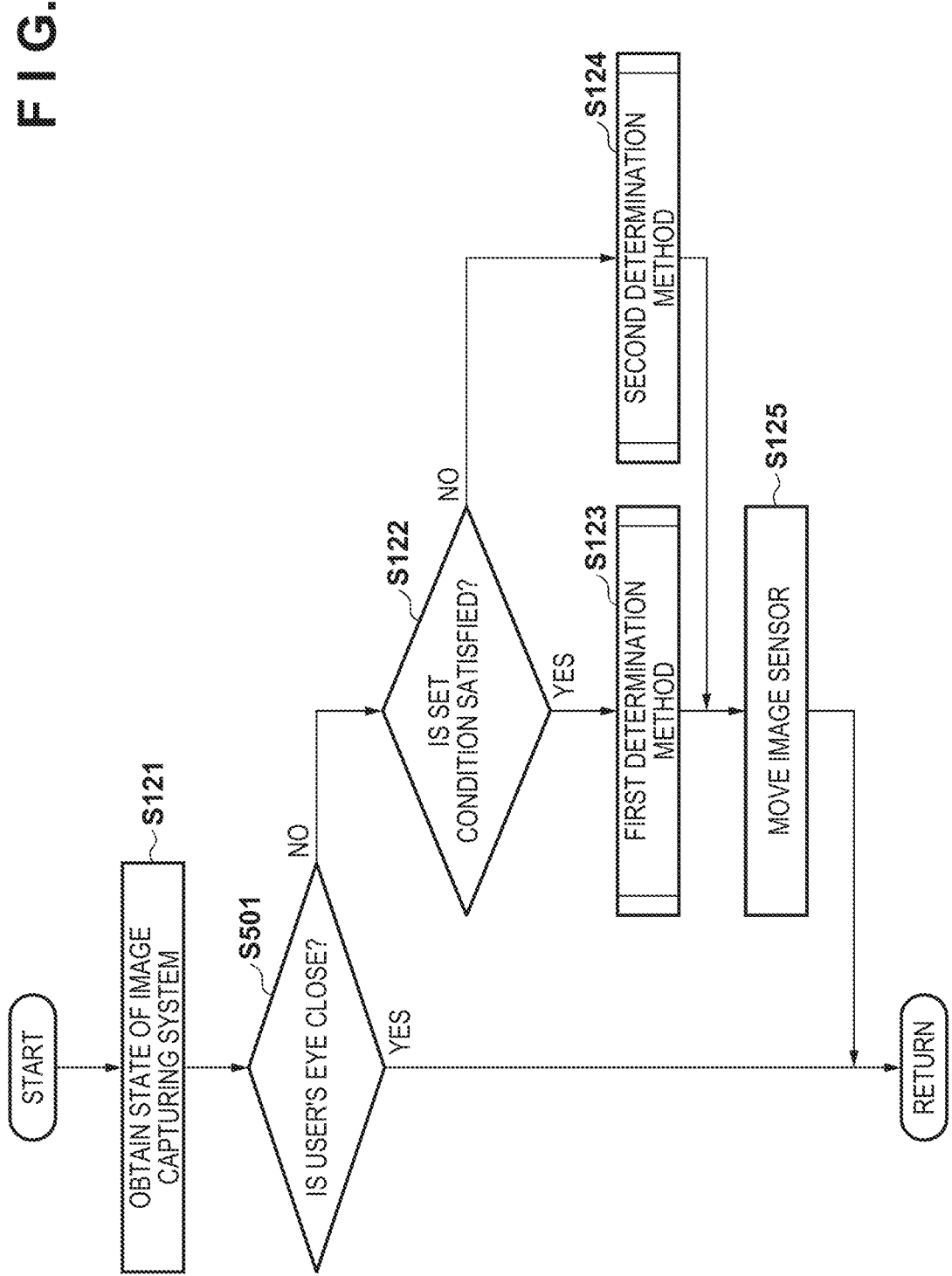
FIG. 13 is a flowchart illustrating processing for moving the center of an image sensor according to a fourth embodiment.

A fourth embodiment of the present invention will be described next. In the fourth embodiment, control is carried out so that the center of the image sensor 430 is not moved if the state of the image capturing system changes while the user is looking through the viewfinder 33. The process for moving the center of the image sensor 430 carried out at this time, indicated by step S103 in FIG. 3, will be described in detail with reference to the flowchart in FIG. 13. Note that this process is carried out instead of the process illustrated in FIG. 7, and thus processing that is the same as that in FIG. 7 will be described using the same reference signs. Aside from this, the configuration of and processing carried out by the image capturing system is the same as in the first embodiment. Descriptions thereof will accordingly be omitted, and the following will focus only on the differences.

First, in step S121, the state of the image capturing system, i.e., the camera orientation, the F number, the focal length, the focal state, and so on, is obtained. Next, in step S501, the MPU 101 determines whether or not the user is looking through the viewfinder 33 of the camera body 100 (i.e., has his or her eye close to the viewfinder 33) on the basis of an output signal from the proximity sensor 70. The process ends if it is determined that the user is looking through the viewfinder 33. In other words, the center of the image sensor 430 is not moved. However, the process moves to step S122 if it is determined that the user is not looking through the viewfinder 33.

In step S122, the MPU 101 determines whether or not the state of the image capturing system, obtained in step S121, satisfies the aforementioned set condition. If the set condition is satisfied, in step S123, a target position in the center of the image capturing region is determined in accordance with the first determination method. However, if the set condition is not satisfied, in step S124, a target position in the center of the image capturing region is determined in accordance with the second determination method.

In step S125, the center of the image sensor 430 is moved to the position determined in accordance with the first determination method or the second determination method, after which the process returns to FIG. 3.

If the user changes the camera orientation while observing a subject image through the viewfinder 33, it is conceivable that he or she will notice an unanticipated fluctuation in the angle of view, and will therefore be unable to concentrate on taking the shot. Additionally, if the camera orientation has been changed during a composition which has the subject image within the center of the screen of the eyepiece-based liquid crystal monitor 30, a fluctuation in the angle of view may cause the subject image to shift from the center of the screen, confusing the user. Accordingly, carrying out control such as that illustrated in FIG. 13 ensures that the center of the image sensor 430 will not move even if the camera orientation is changed while the user is looking through the viewfinder 33. This makes it possible to solve the aforementioned problem. Unanticipated fluctuations in the angle of view while the user's eye is close to the viewfinder negatively impacts the user's chance to take a shot, and thus carrying out such control makes it possible to suppress occurrences of failed shooting.

According to the control carried out in the fourth embodiment as described above, the image sensor is not moved at timings where fluctuations in the angle of view caused by image sensor movement may negatively impact the user's chance to take a shot. By carrying out such control, image stabilization which suppresses the effects of vignetting can be carried out within a range that does not interfere with the user's chance to take a shot.

Note that the present invention may be applied both in a system constituted by a plurality of devices, and in an apparatus constituted by a single device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-088574, filed on May 8, 2019 which is hereby incorporated by reference herein in its entirety.

What is claimed is:

1. An image stabilization apparatus, comprising at least one processor and/or circuitry which function as:
   a first obtaining unit that obtains orientation information of an image capturing apparatus;
   a determining unit that, on the basis of the orientation information, determines a reference position of an image sensor included in the image capturing apparatus; and
   a calculating unit that calculates a correction amount for performing image stabilization by moving a position of the image sensor from the reference position in a plane intersecting with an optical axis,
   wherein the reference position is different between when the orientation information indicates that the image capturing apparatus is in a first orientation and when the orientation information indicates that the image capturing apparatus is in a second orientation.

2. The image stabilization apparatus according to claim 1, wherein the determining unit:
   determines the reference position on the basis of lens information of a lens unit attached to the image capturing apparatus, the lens information corresponding to the orientation information, when the orientation information indicates the first orientation; and
   determines the reference position on the basis of information of the image capturing apparatus when the orientation information indicates the second orientation.

3. The image stabilization apparatus according to claim 2, wherein the image capturing apparatus includes a shutter; and
   the information of the image capturing apparatus includes information of a frame of an opening in the shutter.

4. The image stabilization apparatus according to claim 2, wherein the information of the image capturing apparatus includes information of a range of movement of the image sensor.

5. The image stabilization apparatus according to claim 2, wherein the information of the image capturing apparatus includes information of a position at which a reset curve of an electronic front curtain implemented by adjusting a timing at which to reset a charge is adjusted.

6. The image stabilization apparatus according to claim 2, wherein the information of the image capturing apparatus includes information of a center position of a mount for attaching a lens unit to the image capturing apparatus.

7. The image stabilization apparatus according to claim 1, wherein the determining unit:
   determines the reference position on the basis of lens information of a lens unit attached to the image capturing apparatus, the lens information corresponding to the orientation information, when the orientation information indicates the first orientation; and
   uses a predetermined first position as the reference position when the orientation information indicates the second orientation.

8. The image stabilization apparatus according to claim 1, wherein the image capturing apparatus includes an actuator that moves the image sensor; and
   the image sensor is moved to the reference position by the actuator before shooting preparations have been instructed by the image capturing apparatus.

9. The image stabilization apparatus according to claim 1, wherein the image capturing apparatus includes an actuator that moves the image sensor; and
   the image sensor is moved to the reference position by the actuator after shooting preparations have been instructed by the image capturing apparatus.

10. The image stabilization apparatus according to claim 1,
    wherein the image capturing apparatus includes an actuator that moves the image sensor; and
    the reference position is calculated by the determining unit in response to a moving image mode being set, and the image sensor is moved to the reference position by the actuator.

11. The image stabilization apparatus according to claim 1,
    wherein the image capturing apparatus includes a viewfinder and at least one processor and/or circuitry which function as a detecting unit that detects when a user is close to the viewfinder; and
    the image sensor is controlled not to move to the reference position when the detecting unit has detected that the user is close to the viewfinder.

12. The image stabilization apparatus according to claim 1,
    wherein the lens information includes at least one of image circle center position information, image circle diameter information, and information of a highest-resolution position of the lens unit.

13. The image stabilization apparatus according to claim 1,
    wherein the image capturing apparatus includes an actuator that moves the image sensor; and
    the reference position is calculated by the determining unit in response to a moving image mode being set, and the image sensor is moved to the reference position by the actuator.

14. The image stabilization apparatus according to claim 1 further comprising an image sensor.

15. An image stabilization control method, comprising:
obtaining orientation information of an image capturing apparatus;
determining, on the basis of the orientation information, a reference position of an image sensor included in the image capturing apparatus; and
calculating a correction amount for performing image stabilization by moving a position of the image sensor from the reference position in a plane intersecting with an optical axis,
wherein the reference position is different between when the orientation information indicates that the image capturing apparatus is in a first orientation and when the orientation information indicates that the image capturing apparatus is in a second orientation.

16. A non-transitory computer-readable storage medium in which is stored a program for causing a computer to function as the respective units in the image stabilization apparatus comprising:
a first obtaining unit that obtains orientation information of an image capturing apparatus;
a determining unit that, on the basis of the orientation information, determines a reference position of an image sensor included in the image capturing apparatus; and
a calculating unit that calculates a correction amount for performing image stabilization by moving a position of the image sensor from the reference position in a plane intersecting with an optical axis,
wherein the reference position is different between when the orientation information indicates that the image capturing apparatus is in a first orientation and when the orientation information indicates that the image capturing apparatus is in a second orientation.

* * * * *